Figure 1:
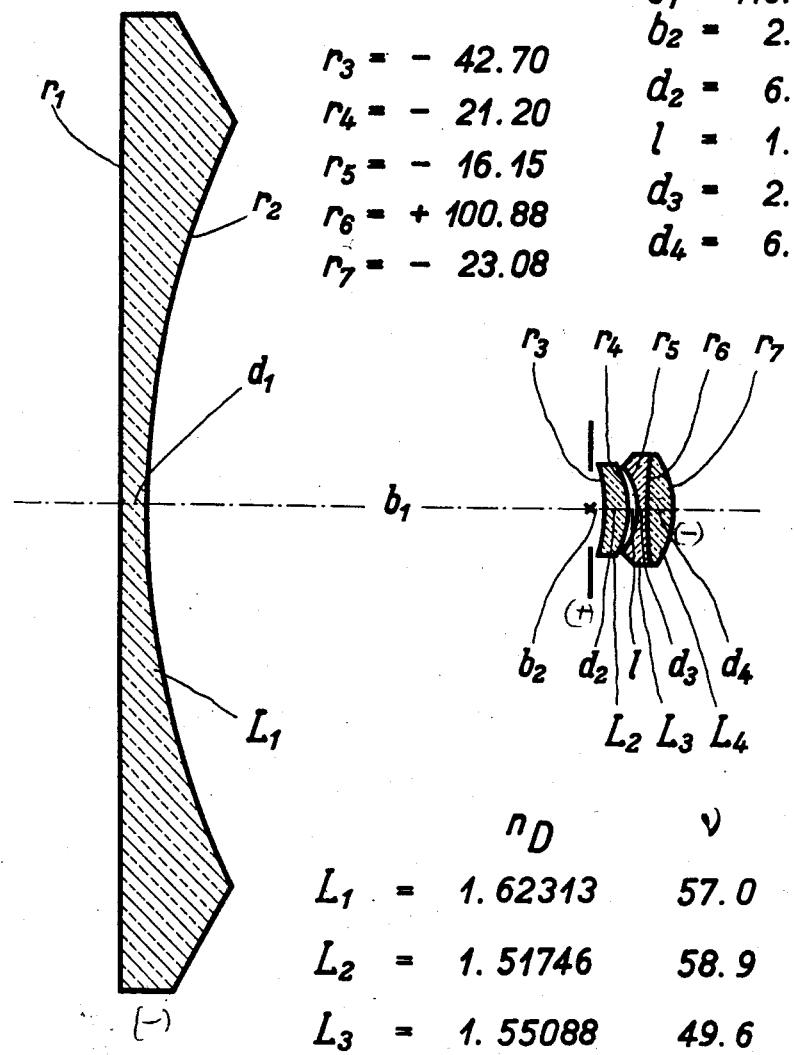

Aug. 9, 1938.  W. MERTÉ  2,126,126
PHOTOGRAPHIC OBJECTIVE
Filed Nov. 27, 1936  2 Sheets-Sheet 1

$r_1 = \infty$
$r_2 = +215.58$ $r_3 = -42.70$
$r_4 = -21.20$
$r_5 = -16.15$
$r_6 = +100.88$
$r_7 = -23.08$ $d_1 = 6.55$
$b_1 = 110.28$
$b_2 = 2.36$
$d_2 = 6.81$
$l = 1.31$
$d_3 = 2.99$
$d_4 = 6.42$

|  | $n_D$ | $\nu$ |
|---|---|---|
| $L_1 =$ | 1.62313 | 57.0 |
| $L_2 =$ | 1.51746 | 58.9 |
| $L_3 =$ | 1.55088 | 49.6 |
| $L_4 =$ | 1.60284 | 60.6 |

Inventor:
Willy Merté

Patented Aug. 9, 1938

2,126,126

UNITED STATES PATENT OFFICE 2,126,126

PHOTOGRAPHIC OBJECTIVE

Willy Merté, Jena, Germany, assignor to the firm Carl Zeiss, Jena, Germany

Application November 27, 1936, Serial No. 113,069
In Germany November 26, 1935

4 Claims. (Cl. 88—57)

Application has been filed in Germany, November 26, 1935.

The invention concerns photographic objectives for image fields subtending a great angle, for instance an angle of 180°. To obtain such large fields, lens systems have been suggested which consist of three members separated by air and whose front member is divergent, the other members being formed according to different ideas. Not only is it rather difficult to obtain by means of a photographic objective so large an image field but also to construct a lens system which corrects the image as well as possible.

While using a divergent front member, the invention considerably improves conditions of correction with respect to the above-mentioned lens system of three members by providing a divergent rear and a convergent medial member and by constructing the rear and medial members as menisci the concave sides of which face the front member, the focal length of the convergent member being at most two fifths of the numerical value of the focal length of one of the two divergent members, and the distance apart of the front lens vertices of the first and the second member being at least three quarters of the focal length of the entire system of lenses.

It has been proved that astigmatism and image curvature can thus be overcome to an extent surpassing very much the corrections which have been possible so far as regards the wide image-field angles concerned. The invention also permits correction of spherical longitudinal aberrations, so that the system can be used for comparatively large apertures.

In the above statements regarding sequence of lenses and lens surfaces, the front lens surface is assumed to be the surface facing the object when reduction is concerned. In the case of magnification, the front lens surface is the surface facing the image.

One member, two or, eventually, all members of the objective may consist of a plurality of lenses. It is especially advantageous to compose the rear member of two lenses which have different refractive indices and are interconnected by a convergent cemented surface. If the chromatic difference of magnification is to be especially small, the said requirement can be met by using a front negative member which consists of more than one lens. It is also advisable to provide such an air space between the second and third members of the objective as is smaller than one tenth of the distance apart of the front lens vertices of the first and second member. When especially great image angles are desired, it is advisable to use as a front member a meniscus the concave side of which faces the medial and rear members.

The accompanying drawings, which illustrate the invention, show by way of example two objectives of three members in sections through the optical axes.

Figure 1 of the drawings represents an objective the first and second members of which are a single divergent lens $L_1$ and a single convergent lens $L_2$, respectively, and whose last member is divergent and consists of two cemented lenses $L_3$ and $L_4$. Between the lenses $L_1$ and $L_2$ is disposed a diaphragm at axial distances $b_1$ and $b_2$, respectively. The objective is spherically corrected for a ratio of aperture of approximately 1:8 and can be used for an image angle up to approximately 180°. The radii, thicknesses and distances and the kinds of glass are indicated in the following table. The measures stated in this table, which are in millimetres have reference to a total focal length of 100 millimetres.

Table 1

| Radii | Thicknesses and distances | Kinds of glass |
|---|---|---|
| $r_1 = \infty$ | | |
| | $d_1 = 6.55$ | $n_d = 1.62313; \nu = 57.0$ |
| $r_2 = +215.58$ | | |
| | $b_1 = 110.28$ | |
| | $b_2 = 2.36$ | |
| $r_3 = -42.70$ | | |
| | $d_2 = 6.81$ | $n_d = 1.51746; \nu = 58.9$ |
| $r_4 = -21.20$ | | |
| | $l = 1.31$ | |
| $r_5 = -16.15$ | | |
| | $d_3 = 2.99$ | $n_d = 1.55088; \nu = 49.6$ |
| $r_6 = +100.88$ | | |
| | $d_4 = 6.42$ | $n_d = 1.60284; \nu = 60.6$ |
| $r_7 = -23.08$ | | |

Figure 2:
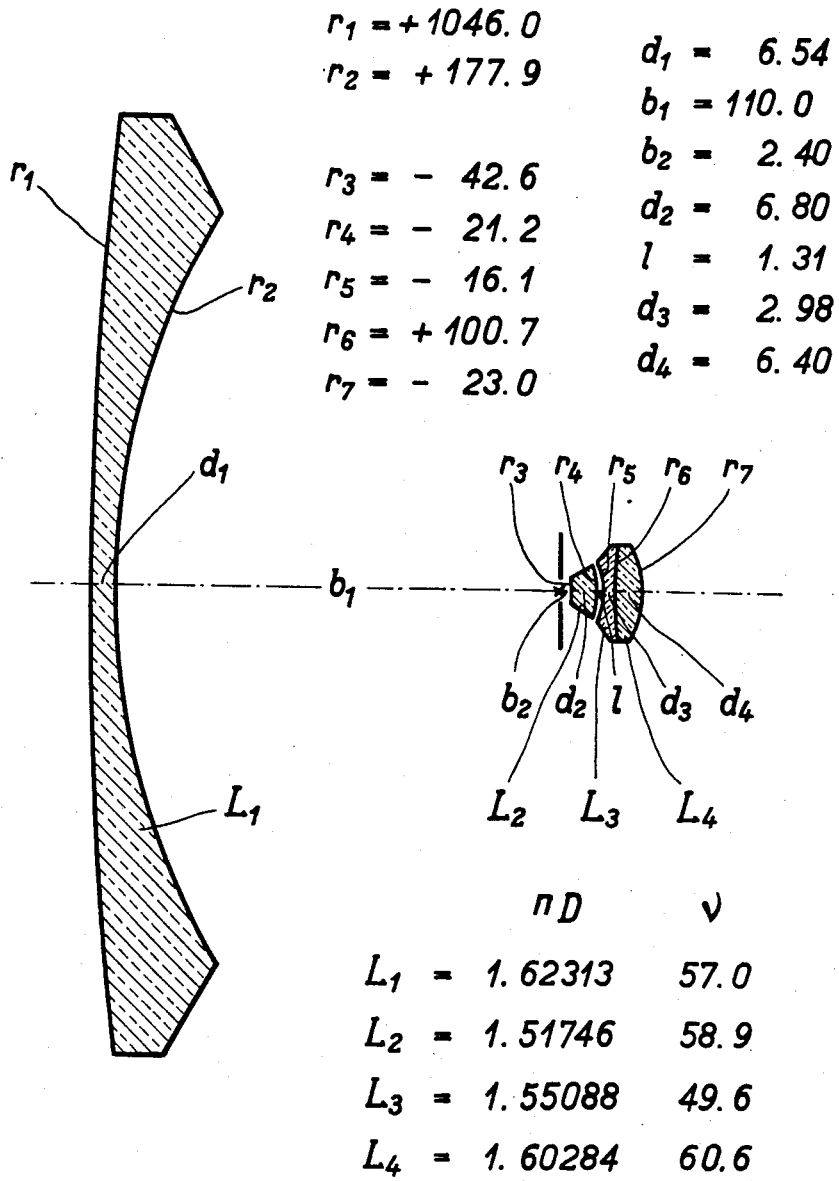

Figure 2 of the drawings represents an objective the front member of which differs in form from that of the objective illustrated by Figure 1. In Figure 2, the front member is a meniscus the concave side of which faces the medial member, and the objective consists, accordingly, of three menisci, the said front, or first, and the second meniscus being a single divergent lens $L_1$ and a single convergent lens $L_2$, respectively, and the third meniscus being composed of two cemented lenses $L_3$ and $L_4$. As in Figure 1, the objective is spherically corrected for a ratio of aperture of 1:8. The radii, thicknesses and distances and the kinds of glass are indicated in the following Table 2. The measures stated in this table, which are in millimetres, have reference to a total focal length of 100 millimetres.

Table 2

| Radii | Thicknesses and distances | Kinds of glass |
|---|---|---|
| $r_1 = +1046.0$ | | |
| | $d_1 = 6.54$ | $n_d = 1.62313; \nu = 57.0$ |
| $r_2 = +177.9$ | | |
| | $b_1 = 110.0$ | |
| | $b_2 = 2.40$ | |
| $r_3 = -42.6$ | | |
| | $d_2 = 6.80$ | $n_d = 1.51746; \nu = 58.9$ |
| $r_4 = -21.2$ | | |
| | $l = 1.31$ | |
| $r_5 = -16.1$ | | |
| | $d_3 = 2.98$ | $n_d = 1.55088; \nu = 49.6$ |
| $r_6 = +100.7$ | | |
| | $d_4 = 6.40$ | $n_d = 1.60284; \nu = 60.6$ |
| $r_7 = -23.0$ | | |

I claim:

1. An objective for photographing or reproducing a large image field, consisting of three members axially spaced by air, the rear and the medial member of the objective being menisci the concave sides of which face the front member, the front and the rear of the said members being divergent and the medial member being convergent, the convergent member having a focal length at least two fifths of the numerical value of the focal length of one of the two divergent members, the front refracting surfaces of the first and the second member having an axial distance apart which is at least three quarters of the total focal length of the objective, and the second and third of the said members having an axial distance apart which is smaller than one tenth of the axial distance apart of the front refractive surfaces of the first and second members of the objective.

2. An objective for photographing or reproducing a large image field, consisting of three members axially spaced by air, the rear and the medial member of the objective being menisci the concave sides of which face the front member, the front and the rear of the said members being divergent and the medial member being convergent, the convergent member having a focal length at least two fifths of the numerical value of the focal length of one of the two divergent members, the rear of the said menisci consisting of two lenses, which have different refractive indices and are interconnected by a convergent cemented surface, and the front refracting surfaces of the first and the second member having an axial distance apart which is at least three quarters of the total focal length of the objective, and the second and third of the said members having an axial distance apart which is smaller than one tenth of the axial distance apart of the front refracting surfaces of the first and second members of the objective.

3. An objective for photographing and reproducing a large image field, consisting of three menisci axially spaced by air, the front meniscus being divergent, the concave side of this front meniscus facing the two other menisci, the medial meniscus being convergent, the rear meniscus being divergent, the concave sides of the medial and rear menisci facing the front meniscus, the convergent meniscus having a focal length which is at most two fifths of the numerical value of the focal length of one of the two divergent members, the front refracting surfaces of the front and the medial meniscus having an axial distance apart which is at least three quarters of the total focal length of the objective, and the second and third of the said members having an axial distance apart which is smaller than one tenth of the axial distance apart of the front refracting surfaces of the first and second members of the objective.

4. An objective for photographing and reproducing a large image field, consisting of three menisci axially spaced by air, the front meniscus being divergent, the concave side of this front meniscus facing the two other menisci, the medial meniscus being convergent, the rear meniscus being divergent, the concave sides of the medial and rear menisci facing the front meniscus, the convergent meniscus having a focal length which is at most two fifths of the numerical value of the focal length of one of the two divergent members, the front refracting surfaces of the front and the medial meniscus having an axial distance apart which is at least three quarters of the total focal length of the objective, the medial and rear of the said menisci having an axial distance apart which is smaller than one tenth of the axial distance apart of the front refracting surfaces of the front and medial menisci, and the rear meniscus consisting of two lenses which have different refractive indices and are interconnected by a convergent cemented surface.

WILLY MERTÉ.